April 6, 1954 J. R. GIER, JR 2,674,424
FURNACE CONVEYER BELT
Filed Dec. 22, 1949
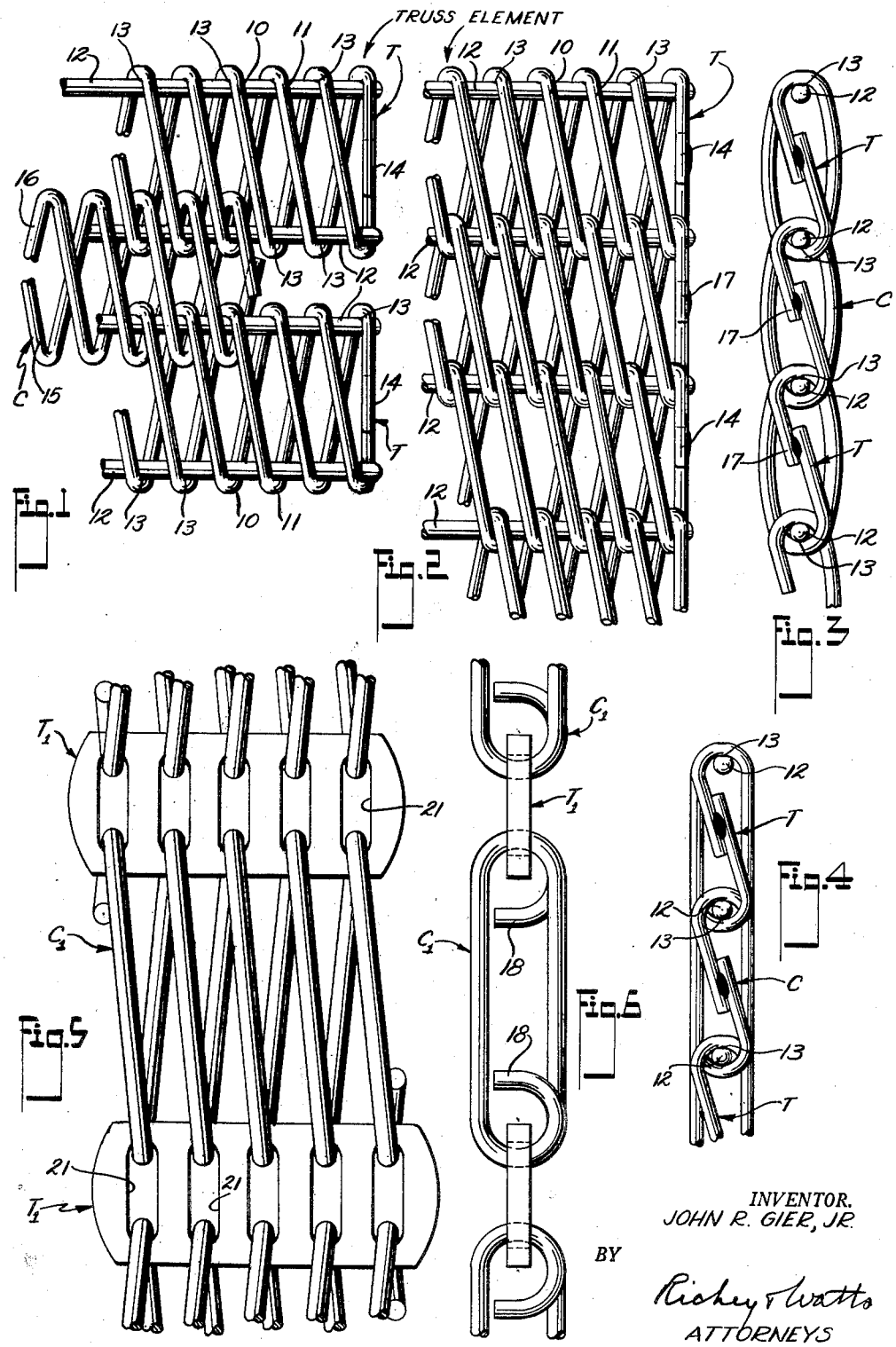
INVENTOR.
JOHN R. GIER, JR.
BY
Richey & Watts
ATTORNEYS Patented Apr. 6, 1954

2,674,424

UNITED STATES PATENT OFFICE 2,674,424

FURNACE CONVEYER BELT

John R. Gier, Jr., Hudson, Ohio

Application December 22, 1949, Serial No. 134,412

5 Claims. (Cl. 245—6)

This invention relates to conveyor belts and is especially important when applied in the construction of conveyor belts intended for use at elevated temperatures, such as encountered in continuous brazing and annealing furnaces and the like.

Belts for this service are now sold in the trade and generally take the form of lengths of wire formed as flattened spirals and extending across the belt, which lengths are interlinked to form hinge connections. Often, there are cross rods inserted through the loops at the hinge points of the mating spirals and held in place at the edges of the belt by welding or any suitable fastening means. Conveyor belts of this design are available in various meshes and sizes and have come to be considered as standard equipment for high temperature service in brazing, annealing and similar furnaces.

Service experience with the aforesaid type of wire belt reveals that a condition referred to in the trade as "camber" arises which becomes increasingly serious as use of the belt continues. Although the exact causes of camber may not be known, the results thereof are well known, and in appearance camber manifests itself as a transverse curvature of the spirals and of the end connected cross rods, if present. The transverse spirals and rods may take the form of a simple curve across the belt or may take the form of a compound or ogee curve in the plane of the belt.

The effect of either form of belt camber is to materially shorten the life of the belt. Belt life is decreased because the spirals and rods no longer lie in a straight line perpendicular to the direction of belt travel, so they tend to stiffen the belt and resist the mechanical pivoting action that would otherwise occur as the belt passes over the main rollers at each end of the furnace. Thus, with prior belts, passage of the belt around the rollers can only be accomplished if the rods and the spirals flex and bend. The latter action tends to loosen any protective scale of oxide that may have formed on the belt, thereby facilitating re-oxidation. Also, at the elevated temperatures encountered in furnace service, such flexing may deform the material past its elastic limit so that failure of the belt occurs more quickly than it would occur if such flexing were not present. Obviously, such flexing will reduce the life of the belt when it is employed at any temperature, including room temperatures.

Another disadvantage resulting from a cambered belt is that the belt tends to hump up as it passes over the rollers, particularly at the entry side of the furnace which is a zone of minimum tension. As a result a plane platform is not provided for the support of objects to be carried on the belt and passed through the furnace. Since it is not desirable to increase the tension of the belt past that necessary to pull the belt and the load around the rollers, tension at the entry roller is at a minimum and any camber present in the belt is often the cause of a humping or lifting of the belt at the low tension or entry zone.

It is a principal object of the invention to eliminate camber of the belt with the attendant advantages of increased belt life and the elimination of humping of the belt at the entry zone. Briefly, this is accomplished by forming the belt with a series of truss members extending across its width which are telescopically pivoted to intermediate connecting members such as the usual wire helices.

In the preferred form of the invention, subassemblies that act as truss members are formed by welding the cross or hinge rods to the conventional helical members, not only at the ends but at every point of contact with the loops. This converts the subassembly into a truss unit or member that is exceptionally rigid in the plane of the belt. Where the member is of welded helical wire construction, it becomes one that is made up of a continuous series of closed triangles which is the most rigid of all structural arrangements, it being understood that the triangle is an inherently rigid device even if its joints are pinned.

The intermediate or connector helices may be of conventional construction, threaded between truss members and arranged so that the truss members can, if necessary, approach one another which permits the belt to lay flat in the low tension zone end while proceeding through the furnace. I have found that a belt of this truss construction shows little tendency to camber, weighs no more than the standard belt, and in the preferred form the only increase in cost over the standard belt is that of the simple and rapidly performable welding operations required at each loop, the cost of this operation being more than offset by increased belt life.

The manner in which these objects and advantages may be attained will be better understood from the following detailed description of a preferred embodiment of the invention.

In the drawings:

Fig. 1 is a fragmentary view of a partially assembled belt;

Fig. 2 shows a completely assembled fragment;

Fig. 3 is a side view of the belt;

Fig. 4 is a side view showing how the belt may undergo an additional flattening operation; and Figs. 5 and 6 show a modified form having the advantages of the invention.

Referring to the form shown in Figs. 1 to 4, a wire belt is disclosed having alternate truss elements T and helical connector elements therefor indicated generally at C. Truss elements T may all be alike and each may comprise a pair of double pitch helices 10 and 11 screwed together and welded to cross rods or members 12 at each point 13 of engagement therewith, the welds being applied entirely across the width of the truss elements. As best seen in Fig. 3 the ends of each helix 10 and 11 may be brought into engagement as at 14 and welded to finish off the edge of the belt.

After the truss members T are completed they are brought into longitudinal alignment and the helical wire or wires of connector C screwed therealong. For example, if the truss members T are of the double pitch helical construction as illustrated, connector members C will be made up of two double pitch helical wires 15 and 16. Connecting helices 15 and 16 are screwed along the truss members until they bridge the lateral extent of the belt, whereupon their ends may be bent into a plane at the edge of the belt and welded together as at 17.

Even though the truss members T are fabricated of wire stock, when formed as described they are quite rigid in the plane of the belt and so prevent camber from raising the belt. Due to the sliding connection of the truss members with the connecting helices C there is no tendency of the belt to hump up at its slack areas and so depart from a planar surface. Likewise the virtual elimination of cambering removes the tendency of the belt to hump and, as mentioned previously, permits a purely mechanical pivoting action to take place as the belt passes over the rollers so that there is no bending or flexing of the wires in the belt, nor is any protective layer of oxide that may have formed thereon disturbed. All of these factors combine to prolong the life of the belt in service.

When welding the cross rods 12 to the helices to form the truss members by resistance welding processes it is important that good pressure contact be had at each loop and resistance or spot welding apparatus usually mutually flattens the loops and cross rods at their zones of contact. If the helices are formed with the longitudinal reaches of the wires somewhat bowed, as shown in Fig. 3, the effect of the mutual flattening as the welding progresses across the cross member is readily accommodated by a slight additional bowing of the longitudinal reaches without requiring appreciable additional force to hold the parts in contact. Of course, after the cross rods are welded to the loops throughout their length, the helices and the rods are again in axial alignment and the truss is in a stable or uniform condition, but the aforesaid temporary deformation may take place during the welding process at each rod.

If the spirals are bowed as mentioned above and it is desired to have the belt surfaces lie exactly in a plane, the helices may be flattened by any suitable means such as a press or rolls after the welding operation, so that the longitudinal reaches of wire are straight, as shown in Fig. 4. This may be desirable for some classes of work where relatively small, easily upset parts are placed directly on the conveyor belt for processing in the furnace.

It can be readily seen that a belt of the preferred construction requires no more material and is no heavier than a comparable belt of standard design, and yet by creating a series of trusses throughout the length of the belt I virtually eliminate camber which has been the most serious difficulty encountered in this service. Although I prefer to weld each loop of the truss members to the associated cross rods, a truss will be formed if only the loops of one helix in the multi-pitch construction are so welded.

The form shown in Figs. 5 and 6 have some points of similarity with that just described, except that here the truss members $T_1$ are formed by punching sheet metal stock of the proper shape to provide elongated apertures 21, which construction likewise forms longitudinally spaced cross members rigidly connected to strut members. Single pitch connecting helices $C_1$ are threaded through the apertures and the ends are bent as at 18 to prevent disassembly. Members $T_1$ serve to provide an effective truss action to prevent camber and the apertures therein permit a certain amount of telescoping of the belt where required to prevent humping thereof. A belt of this design may have the metal parts of the truss members and of the connectors so proportioned that the transverse sectional area of the metal in the truss member is approximately equal to that of the wire helices, thereby affording uniform heating and cooling along the belt length.

I contemplate that various other forms may be produced that embody the essence of the invention, the most important feature of which is the provision of an adequate number of truss members extending across the belt and rigid in the plane of the belt, which members are pivoted for limited telescoping motion with the intermediate belt portions so that camber is virtually eliminated and the belt may be readily caused to lie in a plane under its own weight.

As has been referred to, successful truss element for high temperature belt service must possess the following characteristics:

1. Stiffness in the plane of the belt;
2. Tensile strength equal to that of the connecting wire spirals;
3. No excess weight;
4. Low fabricating cost; and,
5. Ability to absorb local thermal strains without buckling or cracking.

These characteristics are all present in truss members made of the proper material and in accordance with the essence of this invention.

Having completed a description of a preferred embodiment of the invention, I contemplate that the invention is not limited to the aforesaid embodiment, but only by the scope of the appended claims.

What is claimed is:

1. A belt comprising truss members and connectors arranged alternately relative to each other in a row extending edgewise of the truss members for connection together in series, each truss member being a wire helix and a pair of parallel cross rods within, and extending endwise through, the helix and spaced diametrically of the helix from each other, each rod being fixedly bonded to each convolution of its associated helix, each helix being flattened toward the plane defined by its cross rods, the convolutions of each helix forming with its cross rods a row of rigid generally triangular structures which are arranged side by side in a row extending endwise of their associated helix and each one of which is contiguous to, and is disposed with its base opposite from the bases of, those next adjacent to its opposite sides, respectively, the base of said one triangular structure being one of the cross rods of its associated helix and the bases of said next adjacent triangular structures being the other cross rod of said associated helix, each connector being a wire helix having its convolutions respective to the convolutions of each truss member adjacent to it, and being connected to each of its adjacent truss members by having each of its convolutions looped about the adjacent cross rod of each of its adjacent truss members in opposition, endwise of the belt, to the convolutions of said adjacent truss members, respectively, and each convolution of each connector being rockable relative to, and about the axis of, each cross rod about which it is looped.

2. A belt according to claim 1 characterized in that each adjacent truss member and each connector connected thereto have their corresponding convolutions passing through each other, and each two convolutions passing through each other are looped about opposite sides of their associated cross rod.

3. A belt according to claim 2 characterized in that the helices have the same direction of twist.

4. A belt comprising truss members and connectors arranged alternately relative to each other in a row extending edgewise of the truss members for connection together in series, each truss member being a wire helix and a pair of parallel cross rods within, and extending endwise through, the helix and spaced diametrically of the helix from each other, each rod being fixedly bonded to each convolution of its associated helix, each helix being flattened toward the plane defined by its cross rods, the convolutions of each helix forming with its cross rods a row of rigid generally triangular structures which are arranged side by side in a row extending endwise of their associated helix and each one of which is contiguous to, is disposed with its base opposite from the bases of, those next adjacent to its opposite sides, respectively, the base of said one triangular structure being one of the cross rods of its associated helix and the bases of said next adjacent triangular structures being the other cross rod of said associated helix, each connector being connected at each edge to the adjacent truss member at said edge at locations which are substantially at each point of connection of the helix of said adjacent truss member with the one of its cross rods adjacent said edge.

5. A belt according to claim 4 characterized in that each connector, at each one of said locations, has a connecting portion which extends through the truss convolution nearest said one of the locations and which portion is looped about the cross rod at said one of the locations for rocking relative thereto about the axis thereof.

References Cited in the file of this patent

UNITED STATES PATENTS

| Number | Name | Date |
| --- | --- | --- |
| 502,087 | Tourasse | July 25, 1893 |
| 2,125,717 | Guba | Aug. 2, 1938 |
| 2,151,913 | Harter | Mar. 28, 1939 |
| 2,292,663 | Scherfel | Aug. 11, 1942 |
| 2,370,954 | Guba | Mar. 6, 1945 |